United States Patent
Schmidt et al.

(10) Patent No.: US 7,163,249 B2
(45) Date of Patent: Jan. 16, 2007

(54) AUTOMOTIVE MOVABLE CENTER STACK PANEL WITH INTEGRATED ROLLER TRACK

(75) Inventors: Robert Mark Schmidt, Livonia, MI (US); John A. Stack, Shelby Township, MI (US)

(73) Assignee: Lear Corporation, Southfield, MI (US)

( * ) Notice: Subject to any disclaimer, the term of this patent is extended or adjusted under 35 U.S.C. 154(b) by 204 days.

(21) Appl. No.: 10/711,449

(22) Filed: Sep. 20, 2004

(65) Prior Publication Data

US 2006/0061124 A1    Mar. 23, 2006

(51) Int. Cl.
*B60N 3/12*    (2006.01)
(52) U.S. Cl. .................. 296/37.12; 296/37.8; 224/483; 224/281
(58) Field of Classification Search ............... 296/37.8, 296/37.12; 224/483, 281
See application file for complete search history.

(56) References Cited

U.S. PATENT DOCUMENTS

| | | | |
|---|---|---|---|
| 6,176,534 B1 | 1/2001 | Duncan | |
| 6,354,649 B1 | 3/2002 | Lee | |
| 6,669,258 B1 | 12/2003 | Kato | |
| 6,709,041 B1 | 3/2004 | Hotary et al. | |
| 2002/0003354 A1 | 1/2002 | Inoue et al. | |
| 2003/0146640 A1 | 8/2003 | Nakajima | |
| 2006/0060620 A1* | 3/2006 | Schmidt et al. | ............. 224/275 |
| 2006/0066120 A1* | 3/2006 | Svenson et al. | ......... 296/37.12 |
| 2006/0103160 A1* | 5/2006 | Lota | ........................ 293/37.12 |

FOREIGN PATENT DOCUMENTS

| | | |
|---|---|---|
| EP | 1454796 A2 | 2/2004 |
| JP | 6-1282139 A | 12/1986 |

* cited by examiner

*Primary Examiner*—Lori L. Coletta
(74) *Attorney, Agent, or Firm*—Earl LaFontaine, Esq.; Artz & Artz, P.C.

(57) ABSTRACT

An automotive center stack panel assembly is provided comprising an inner retainer panel including a recessed display mount. A video display panel assembly is mounted to the recessed display mount and has a display angle orientation. At least one roller guide formed on the inner retainer panel. An outer main bezel is included having a bezel outer panel surface. A control panel is positioned between the inner retainer panel and the outer main bezel. A plurality of roller elements are positioned within the at least one roller guide and retained therein by the outer main bezel. The control panel is movable between a display hidden position and a display exposed position. The control panel covers the recessed display mount when in the display hidden position.

20 Claims, 4 Drawing Sheets

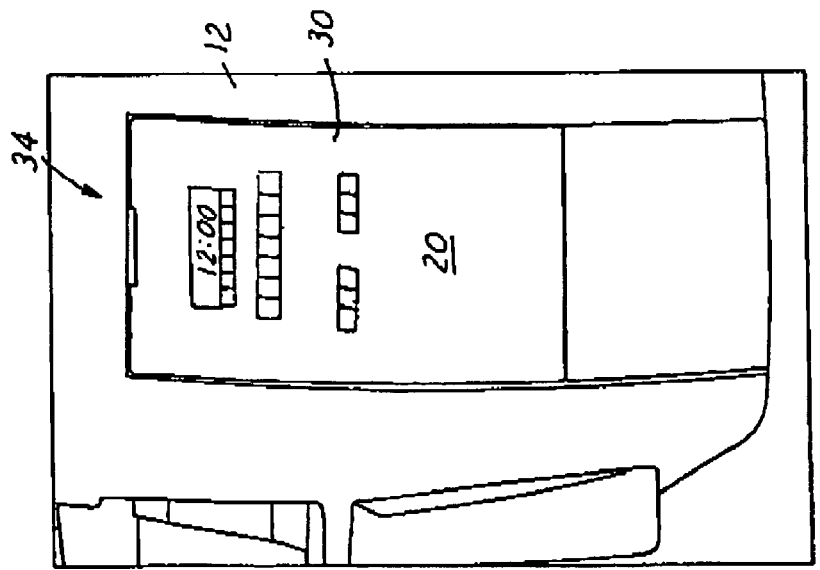
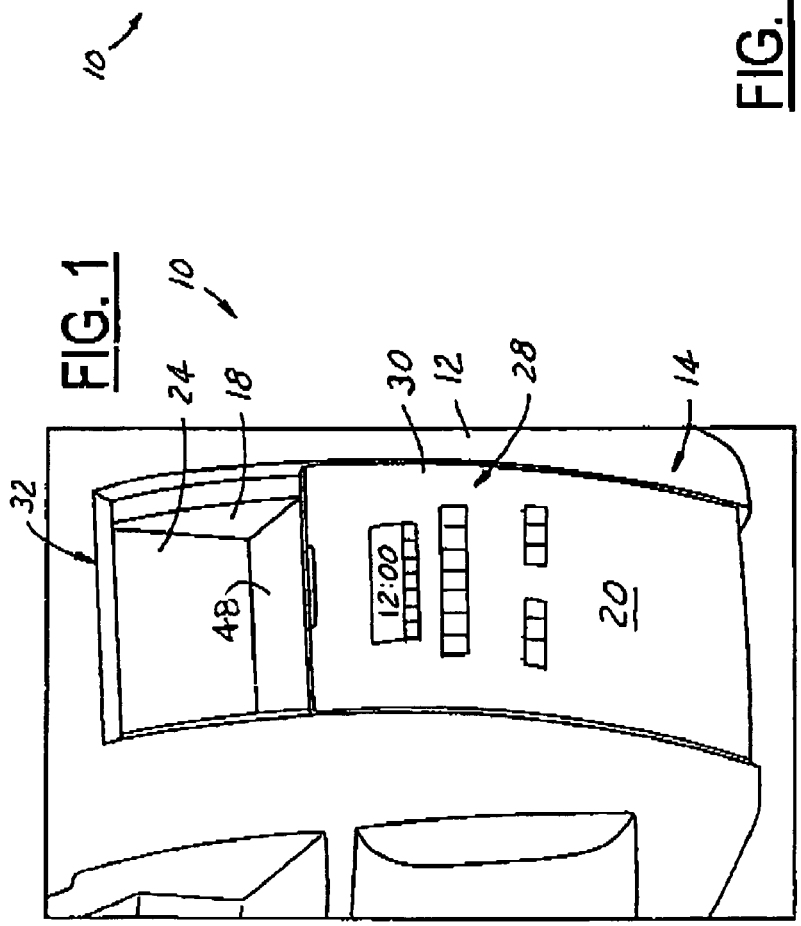
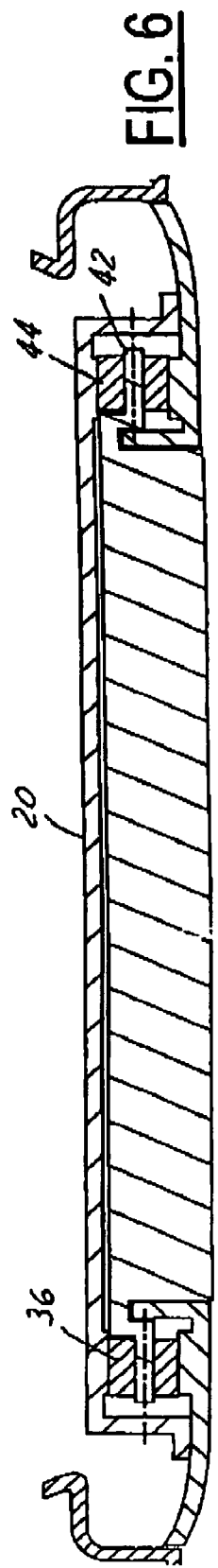

AUTOMOTIVE MOVABLE CENTER STACK PANEL WITH INTEGRATED ROLLER TRACK

TECHNICAL FIELD

The present invention relates generally to an automotive movable center stack panel with hidden display and more particularly to an automotive center stack panel with hidden display utilizing an integrated roller track.

BACKGROUND OF THE INVENTION

Automotive dash and control panels have been designed to incorporate an ever increasing array of controls and features. The increasing number of features has placed an increased value on instrument panel real estate. Increased density of controls and displays can hamper operator interaction. It is preferably for such interactions to be simplified so as to minimize distraction from primary vehicle operation. Under these desirable design constraints, automotive designers are now directed to incorporate navigation and other video displays into the already burdened center stack panels.

The video displays must be a reasonable dimension to facilitate easy visibility for a range of occupant sizes and proportions. The dimensions suitable for proper viewing can require a significant region of the center stack panel. Additionally, mounting a video display on the outer surface of the center stack panel often produces viewing angles that are poorly optimized for operation viewing. In this fashion, incorporation of video displays into the center stack or other vehicle control regions provides a significant challenge to automotive designers. It would be highly desirable to have a video display that provided a wide range of visibility for various occupants without resulting in an overly increased density of additional controls and features.

An additional challenge regarding video displays stems from the nature of their use within the automotive environment. Use for navigation and entertainment often only represents a small portion of vehicle operational time. During the remaining portions of time when the displays are not utilized they represent underutilized space within the vehicle interior. They may also create an undesirable appearance or distraction when they are not in operation. It would, therefore, be highly desirable to have a video display that only usurped valuable panel space when in operation.

SUMMARY OF THE INVENTION

It is, therefore, an object of the present invention to provide an automotive center stack panel with hidden display. It is a further object of the present invention to provide such an automotive center stack panel which minimizes the impact of the display on control feature density.

An automotive center stack panel assembly is provided comprising an inner retainer panel including a recessed display mount. A video display panel assembly is mounted to the recessed display mount and has a display angle orientation. At least one roller guide formed on the inner retainer panel. An outer main bezel is included having a bezel outer panel surface. A control panel is positioned between the inner retainer panel and the outer main bezel. A plurality of roller elements are positioned within the at least one roller guide and retained therein by the outer main bezel. The control panel is movable between a display hidden position and a display exposed position. The control panel covers the recessed display mount when in the display hidden position.

Other objects and features of the present invention will become apparent when viewed in light of the detailed description of the preferred embodiment when taken in conjunction with the attached drawings and appended claims.

BRIEF DESCRIPTION OF THE DRAWINGS

FIG. 1 is an illustration of an automotive center stack panel assembly in accordance with the present invention, the automotive center stack panel assembly illustrated in the display exposed position.

FIG. 2 is an illustration of the automotive center stack panel assembly illustrated in FIG. 1, the automotive center stack panel assembly illustrated in the display hidden position.

FIG. 6 is a cross-sectional illustration of the automotive center stack panel assembly illustrated in FIG. 1.

DESCRIPTION OF THE PREFERRED EMBODIMENT(S)

Figure 5:
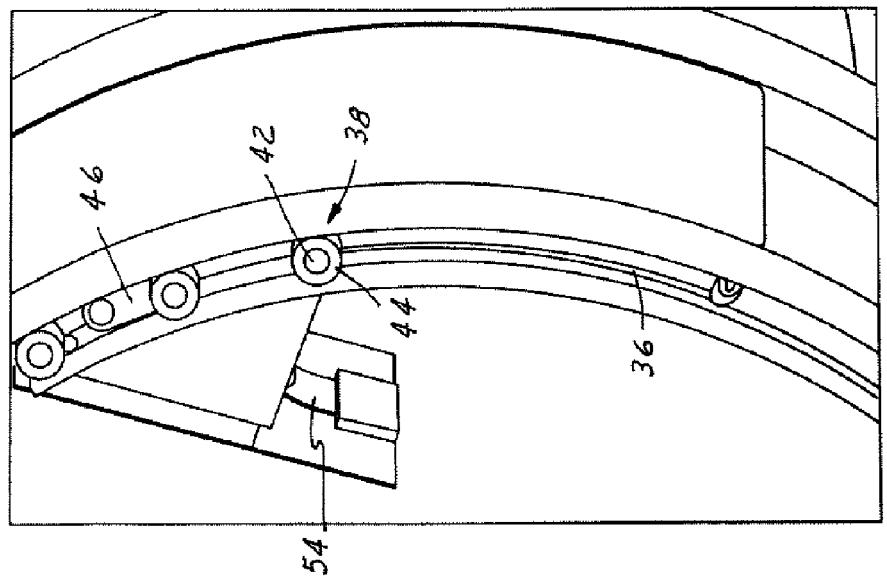
FIG. 5 is detail illustration of the roller guide for use in the automotive center stack panel assembly illustrated in FIG. 1.

Referring now to FIG. 1, which is an illustration of an automotive center stack panel assembly 10 in accordance with the present invention. The automotive center stack panel assembly 10 illustrated is intended to encompass a wide variety of instrument panel assemblies suitable for automotive applications. As such, the automotive center stack panel assembly 10 includes an outer main bezel 12 having a bezel outer panel surface 14. A center bezel chamber 16 is open to allow selective exposure to a recessed display mount 18 formed in a retainer panel 20 positioned behind the outer main bezel. A video display panel assembly 22 is mounted at the rear of the recessed display mount 18. This allows the video display view orientation 24 to be optimized for any occupants without regard to the contour of the bezel outer panel surface 14. It is contemplated that the video display panel assembly 22 may encompass a wide variety of applications, although a navigation system or audio system is preferred.

The present invention allows for selective use of the video display panel assembly 22 through the use of a control panel 26 slidably engaged within the center bezel chamber 16. Control panels 26 are known to provide access to a variety of controls and features within the automotive environment. The control panel 26 includes a plurality of control buttons 28 positioned on the control panel outer surface 30. The control panel 22 is slidably movable between a display exposed position 32 and a display hidden position 34 (see FIG. 2). In the display hidden position 34 the control panel 26 moves upward to completely cover the recessed display mount 18. This provides a plurality of benefits. By covering the recessed display mount 18, the control panel 26 prevents the video display panel assembly 22 from becoming a distraction or giving an unsightly appearance when not activated. Additionally, by moving upward into the display hidden position 34, the control panel 26 moves the plurality of control buttons 28 upwards where they may be more easily accessed by a vehicle operator. The control panel 26 preferably moves between the display hidden position 34 and the display exposed position 32 while the control outer surface 30 remains coincident with the bezel outer panel surface 14. This insures a positive finish appearance in both positions while more effectively hiding the recessed display mount 22 when in the display hidden position 34.

The present invention accomplished this coordination through the use of a roller guide 36 formed on the inner retainer panel 20. The control panel 26 includes a plurality of roller elements 38 formed along its sidewalls 40. The roller elements 38 preferably include a pin assembly 42 having a roller bearing 44 rotatably mounted to it. A rotatable pin extension 46 may be utilized to mount the roller bearing 44 to the pin assembly 42. The use of the rotatable pin extension 46 allows for close pin positioning as well as reducing incidents of binding of the control panel 26 movement. The roller elements 38 are positioned within the roller guide 36 are movable retained therein by way of the outer main bezel 12. In this fashion, the control panel is slidable up and down within the center bezel chamber 16 to allow selective exposure of the video display panel assembly 22. It is preferable that a display shelf 48 may be formed under the recessed display mount 18 for a finished appearance.

Figure 3:
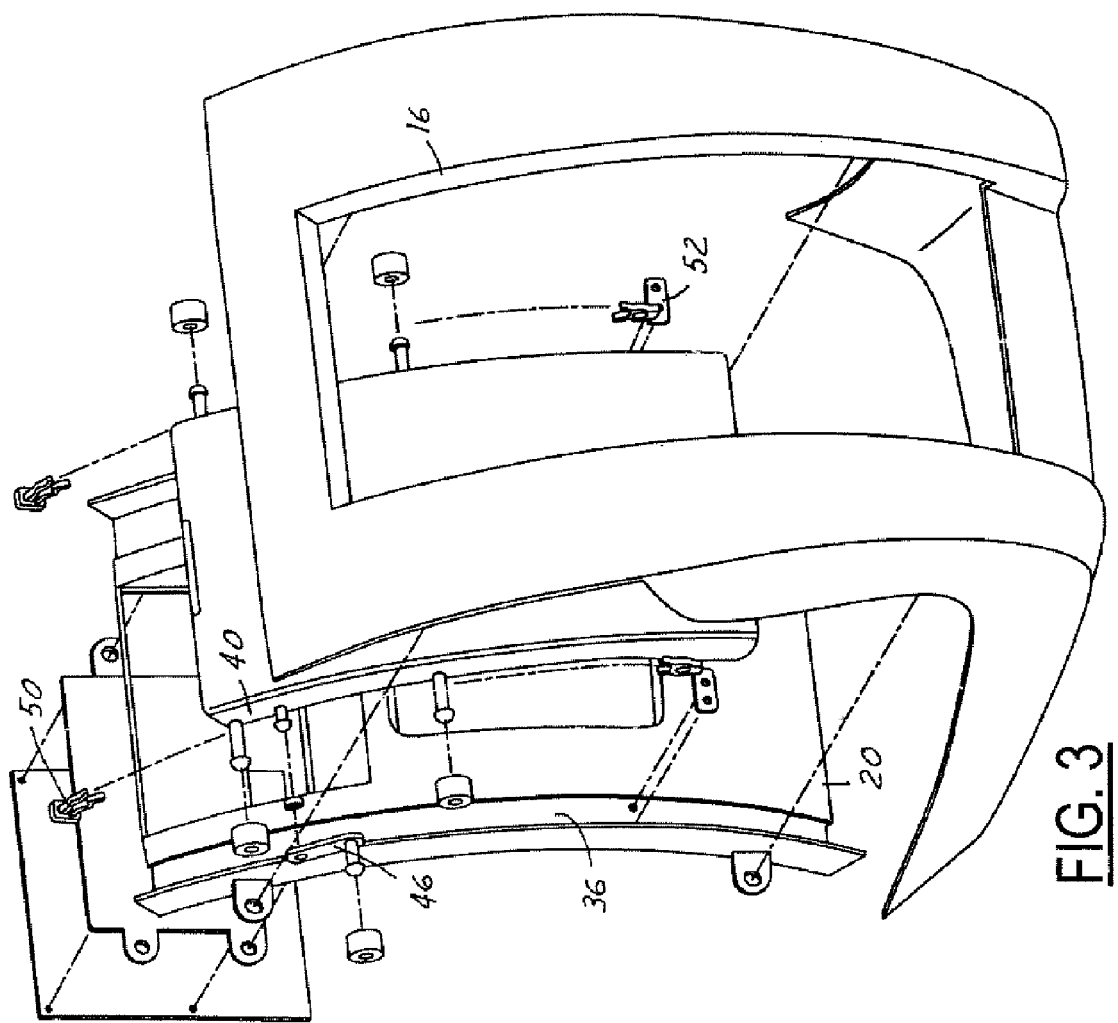
FIG. 3 is an exploded view illustration of the automotive center stack panel assembly illustrated in FIG. 1, the trigger mechanism illustrated in the back engagement stable position.
Figure 4:
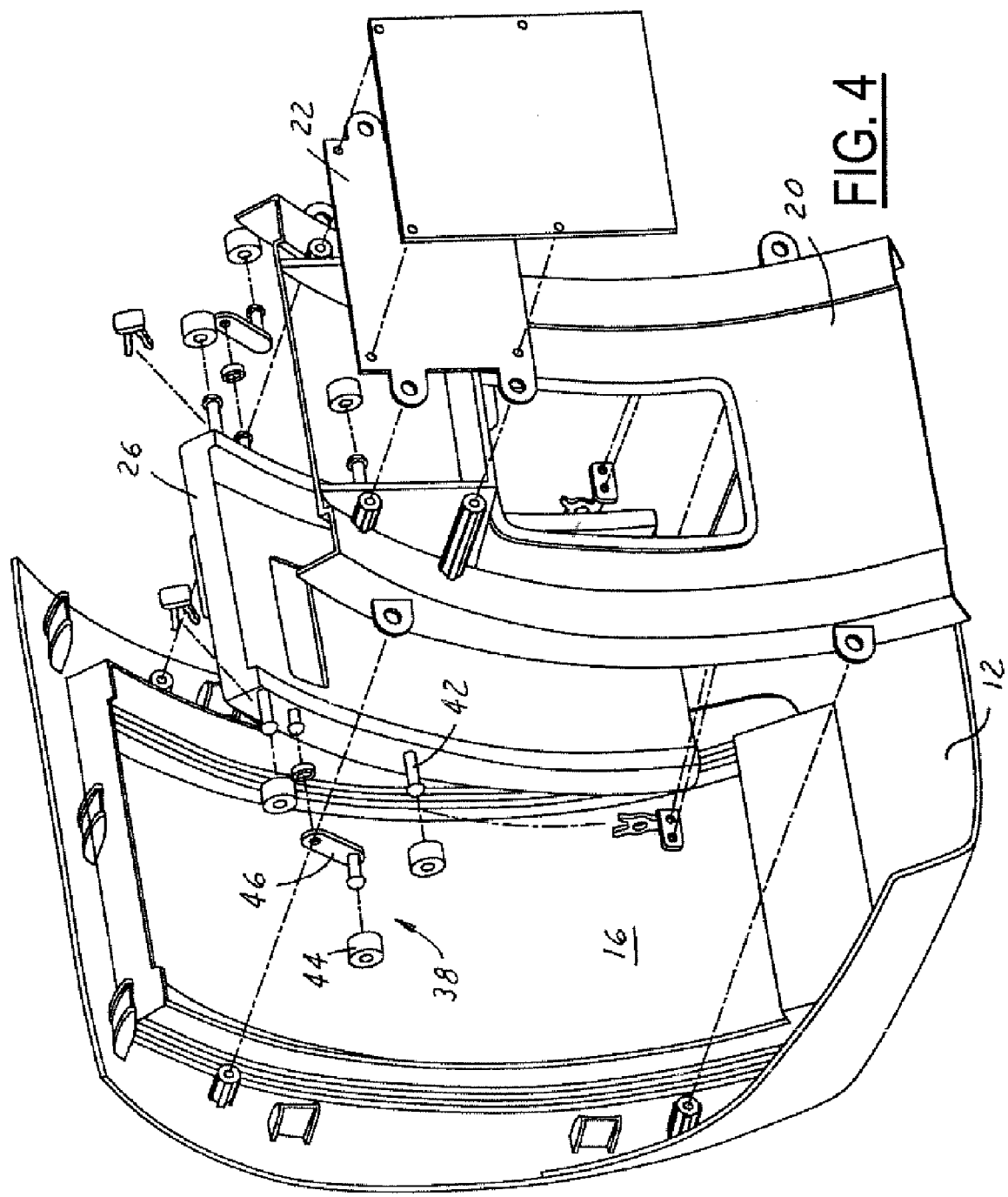
FIG. 4 is a rear view illustration of the automotive center stack panel assembly illustrated in FIG. 3.

The control panel 26 may be retained in the display exposed position 32 and the displayed hidden position 34 through a variety of methodologies. One embodiment is illustrated in FIG. 3. An upper engagement element 50 may be mounted to the inner retainer panel 20 and configured to frictionally engage one of the pin assemblies 42 of the roller elements 38 when the control panel 26 is in the display hidden position 34. Similarly, the present invention can include a lower engagement element 52 configured to engage one of the pin assemblies 42 when the control panel 26 is in the display exposed position 32. In this fashion the control panel 26 can be secured in either position by the operator. It should be understood that a variety of other securing methods, both frictional and otherwise, are contemplated by the present invention.

Figure 8:
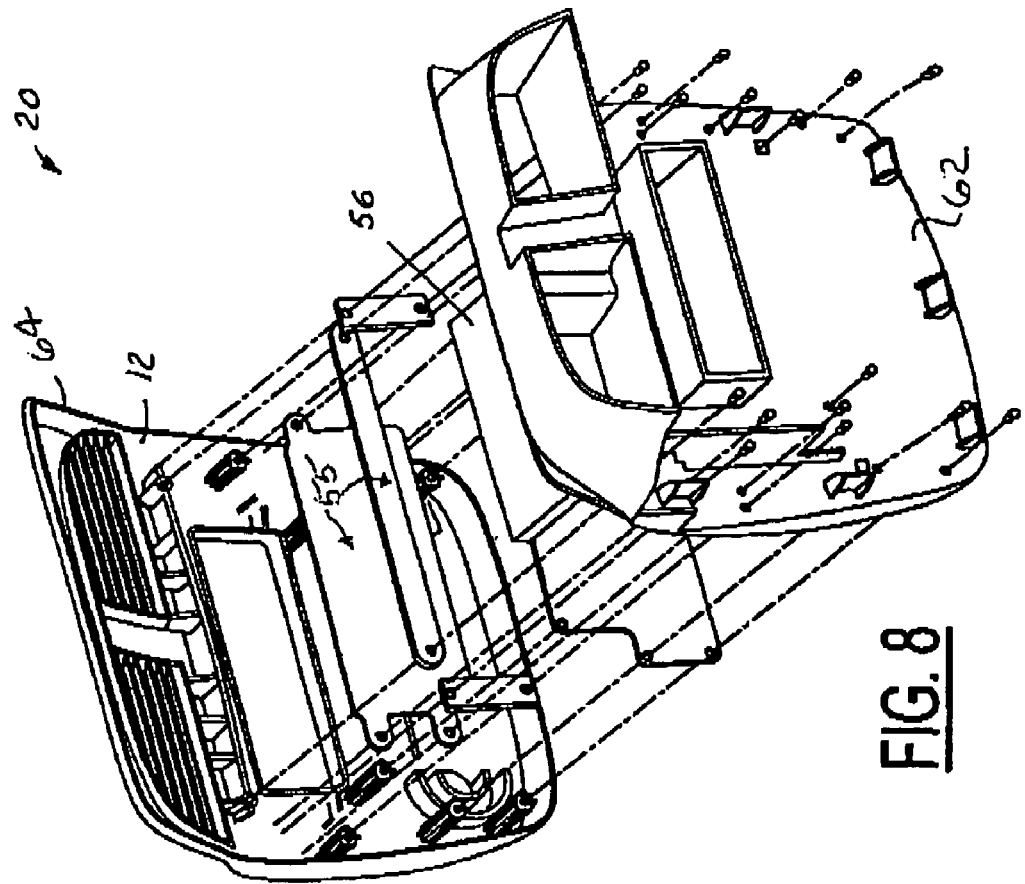
FIG. 8 is an exploded view illustration of the inner retainer panel illustrated in FIG. 7.
Figure 7:
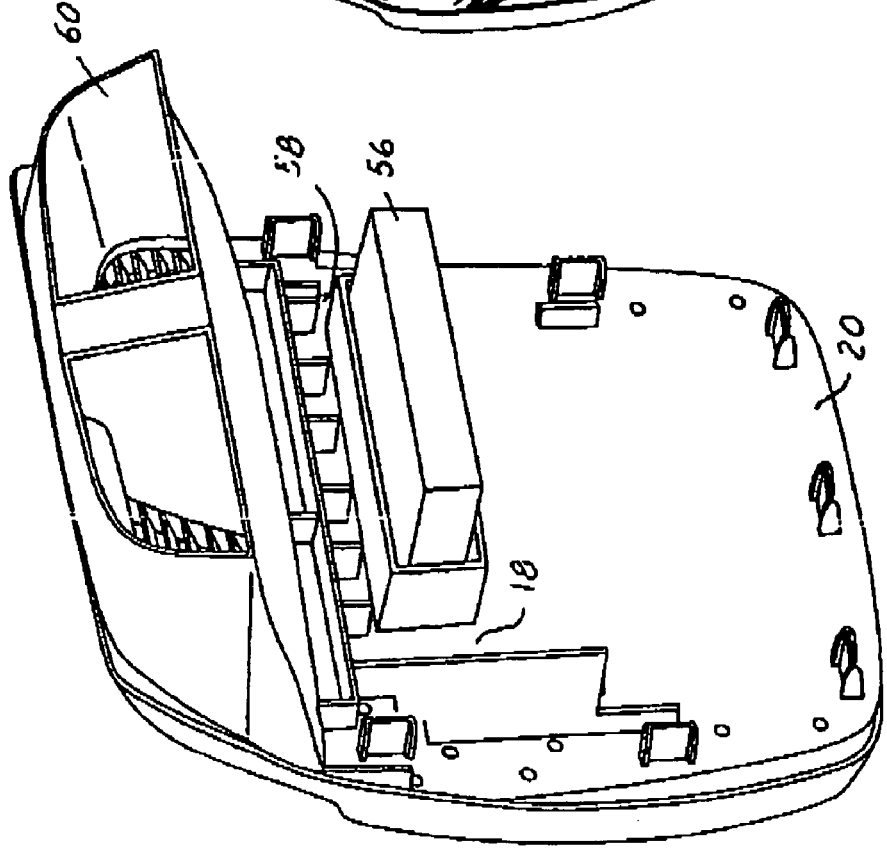
FIG. 7 is an alternate embodiment of an inner retainer panel for use in the automotive center stack panel assembly illustrated in FIG. 1.

Additional features of the present invention include a flexible electronics cable 54 (see FIG. 5) that places the video display panel assembly 22 in communication with the plurality of control buttons 28 on the control panel 26. Further, it is contemplated that additional features may be mounted within the recessed display mount 18 area and thereby selectively exposed through movement of the control panel 26. FIGS. 7 and 8 illustrate an inner retainer panel 20 including an audio component 56 mounted within an component port 58 positioned within the recessed display mount area 18. This could provide convenient access to items such as cd-changers or the like. In such a scenario, the inner retainer panel 20 may be comprised of a rear retainer panel portion 62 and a forward retainer panel portion 64 to provide for the use of a plurality of audio mounts 55 to secure the audio component 56 within the component port 58. Similarly, the inner retainer panel 20 may include a host of other standard automotive features such as HVAC vents 60 which can pass these function through to the outer main bezel 12 and thereby further conserve instrument panel space.

While particular embodiments of the invention have been shown and described, numerous variations and alternative embodiments will occur to those skilled in the art. Accordingly, it is intended that the invention be limited only in terms of the appended claims.

What is claimed is:

1. An automotive center stack panel assembly comprising:
   an inner retainer panel including a recessed display mount;
   a video display panel assembly mounted to said recessed display mount, said video display panel assembly having a display angle orientation;
   at least one roller guide formed on said inner retainer panel;
   an outer main bezel having a bezel outer panel surface; and
   a control panel positioned between said inner retainer panel and said outer main bezel, said control panel comprising a plurality of roller elements positioned within said at least one roller guide and retained therein by said outer main bezel, said control panel movable between a display hidden position and a display exposed position, said control panel covering said recessed display mount when in said display hidden position.

2. An automotive center stack panel assembly as described in claim 1, wherein said control panel includes a control panel outer surface generally coincident with said bezel outer panel surface when said control panel is in both display hidden position and said display exposed position.

3. An automotive center stack panel assembly as described in claim 1, wherein each of said plurality of roller elements comprises:
   a pin assembly extending from said control panel; and
   a roller bearing rotatably engaging said pin assembly.

4. An automotive center stack panel assembly as described in claim 3, further comprising:
   at least one upper engagement element frictionally engaging one of said pin assemblies when said control panel is in said display hidden position.

5. An automotive center stack panel assembly as described in claim 3, further comprising:
   at least one lower engagement element frictionally engaging one of said pin assemblies when said control panel is in said display exposed position.

6. An automotive center stack panel assembly as described in claim 1, wherein said at least one roller element is hidden from view by said outer main bezel.

7. An automotive center stack panel assembly as described in claim 1, further comprising:
   a plurality of control buttons positioned on said control panel outer surface.

8. An automotive center stack panel assembly as described in claim 1, wherein said video display panel assembly comprises a navigation system.

9. An automotive center stack panel assembly as described in claim 1, further comprising:
   an audio component positioned within said recessed display mount.

10. An automotive center stack panel assembly as described in claim 1, wherein said display angle orientation is varied from said bezel outer panel surface to optimize occupant viewing angle.

11. An automotive center stack panel assembly comprising:
    an inner retainer panel including a recessed display mount;

a video display panel assembly mounted to said recessed display mount, said video display panel assembly having a display angle orientation;

at least guide formed on said inner retainer panel;

an outer main bezel having a bezel outer panel surface; and a control panel positioned between said inner retainer panel and said outer main bezel, said control panel slidably engaging said at least one guide, said control panel movable between a display hidden position and a display exposed position, said control panel covering said recessed display mount when in said display hidden position.

12. An automotive center stack panel assembly as described in claim 11, wherein said control panel includes a control panel outer surface generally coincident with said bezel outer panel surface when said control panel is in both display hidden position and said display exposed position.

13. An automotive center stack panel assembly as described in claim 11, further comprising:

at least one upper engagement element mounted to said inner retainer panel, said at least one upper engagement element frictionally engaging said control panel when said control panel is in said display hidden position.

14. An automotive center stack panel assembly as described in claim 11, further comprising:

at least one lower engagement element mounted to said inner retainer panel, said at least one lower engagement element frictionally engaging said control panel when said control panel is in said display exposed position.

15. An automotive center stack panel assembly as described in claim 11, further comprising:

a plurality of control buttons positioned on said control panel outer surface.

16. An automotive center stack panel assembly as described in claim 11, wherein said video display panel assembly comprises a navigation system.

17. An automotive center stack panel assembly as described in claim 11, further comprising:

an audio component positioned within said recessed display mount.

18. An automotive center stack panel assembly as described in claim 11, further comprising:

at least one heating-venting-air-conditioning vents formed through said inner retainer panel.

19. A method of accessing a video display panel assembly within an automotive center stack panel assembly comprising:

sliding a control panel from a display hidden position to a display exposed position thereby exposing a video display panel assembly mounted within a recessed display mount, said control panel slidably engaged between an inner retainer panel and an outer main bezel, said control panel including a plurality of control buttons positioned on a control panel outer surface, said control panel outer surface coincident with a bezel outer panel surface; and sliding said control panel from said display exposed position to said display hidden position to cover said video display panel assembly when said video display panel assembly is not in use, said control panel sliding parallel with said bezel outer panel surface.

20. A method as described in claim 19, further comprising:

retaining said control panel between said inner retainer panel and said outer main bezel by rotatably securing a plurality of roller elements mounted to said control panel within a roller guide formed on said inner retainer panel.

* * * * *